United States Patent
Kakuta et al.

(10) Patent No.: US 9,975,715 B2
(45) Date of Patent: May 22, 2018

(54) DOCUMENT SHEET CONVEYANCE DEVICE AND IMAGE FORMING APPARATUS INCLUDING THE SAME

(71) Applicant: KYOCERA Document Solutions Inc., Osaka-shi, Osaka (JP)

(72) Inventors: Masayuki Kakuta, Osaka (JP); Kikunosuke Tsuji, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days. days.

(21) Appl. No.: 15/484,753

(22) Filed: Apr. 11, 2017

(65) Prior Publication Data

US 2017/0297843 A1 Oct. 19, 2017

(30) Foreign Application Priority Data

Apr. 19, 2016 (JP) ................................. 2016-083288

(51) Int. Cl.
*B65H 5/00* (2006.01)
*B65H 5/36* (2006.01)
(Continued)

(52) U.S. Cl.
CPC ................. *B65H 5/36* (2013.01); *B65H 5/06* (2013.01); *B65H 5/38* (2013.01); *B65H 7/02* (2013.01);
(Continued)

(58) Field of Classification Search
CPC ........ B65H 5/36; B65H 5/38; B65H 2402/31; B65H 2404/50; B65H 2404/51;
(Continued)

(56) References Cited

U.S. PATENT DOCUMENTS 8,109,507 B2 * 2/2012 Okumura ............... B65H 9/006
271/227
8,929,797 B2 * 1/2015 Honma .................... B65H 5/38
271/245

(Continued)

FOREIGN PATENT DOCUMENTS

JP          07309476 A  * 11/1995  .............. B65H 5/36
JP          2001-77978       3/2001
JP          2007145440 A  *  6/2007  .............. B65H 5/36

*Primary Examiner* — Prasad V Gokhale
(74) *Attorney, Agent, or Firm* — Gerald E. Hespos; Michael J. Porco; Matthew T. Hespos

(57) ABSTRACT

A document sheet conveyance device includes an inner guide and an outer guide defining a curved sheet conveyance passage for allowing conveyance of a document sheet from a document sheet feeding section to a predetermined document reading position, and a movable guide projectable into the sheet conveyance passage. The outer guide includes an outer curved guide surface defining an outer surface of the sheet conveyance passage. The inner guide includes an inner curved guide surface defining an inner surface of the sheet conveyance passage, and a first flat part. The movable guide includes a projecting portion projectable into the sheet conveyance passage, and a second flat part provided in the projecting portion. The movable guide is attached to the outer guide in such a way as to allow the first and second flat parts to face each other with the projecting portion projecting in the sheet conveyance passage.

6 Claims, 12 Drawing Sheets

(51) Int. Cl.
    *B65H 7/02*           (2006.01)
    *B65H 5/06*           (2006.01)
    *B65H 5/38*           (2006.01)
    *G03G 15/00*         (2006.01)

(52) U.S. Cl.
    CPC ..... *G03G 15/6529* (2013.01); *B65H 2801/06* (2013.01)

(58) Field of Classification Search
    CPC ............ B65H 2404/60; B65H 2404/61; B65H 2404/612; B65H 2404/63; B65H 2404/65; B65H 2404/693; B65H 2404/694; B65H 2404/6942
    See application file for complete search history.

(56) References Cited

U.S. PATENT DOCUMENTS

| | | | |
|---|---|---|---|
| 2009/0324311 A1* | 12/2009 | Matsumoto .............. | B65H 5/36 399/400 |
| 2012/0224903 A1* | 9/2012 | Honma .................... | B65H 5/38 400/579 |
| 2016/0255211 A1* | 9/2016 | Kawabata ............ | H04N 1/0032 358/1.14 |

* cited by examiner

DOCUMENT SHEET CONVEYANCE DEVICE AND IMAGE FORMING APPARATUS INCLUDING THE SAME

INCORPORATION BY REFERENCE

This application is based on Japanese Patent Application No. 2016-83288 filed with the Japan Patent Office on Apr. 19, 2016, the contents of which are hereby incorporated by reference.

BACKGROUND

The present disclosure relates to a document sheet conveyance device for conveying a document sheet to a predetermined document reading position.

Scanners, copiers and the like include a document sheet conveyance device for automatically conveying a document sheet to be read to a predetermined document reading position. A document sheet conveyance device of this type includes a document tray on which a document sheet to be read is placed, a sheet conveyance passage through which the document sheet is conveyed over the document reading position, and a discharge tray to which the document sheet after being read is discharged. A contact glass is placed at the document reading position to allow an image on a document surface of the document sheet to be optically read therethrough.

There are cases where, in the document sheet conveyance device, a document sheet is placed on the document tray in a state that pen ink or correction liquid on a document surface is still wet or a paper dust or other particles is adhered to the document surface, and the document sheet is nevertheless passed through the sheet conveyance passage.

SUMMARY

A document sheet conveyance device according to an aspect of the present disclosure includes a document sheet feeding section, an inner guide, an outer guide, and a movable guide. The document sheet feeding section feeds a document sheet to be read. The inner guide and the outer guide define a curved sheet conveyance passage for allowing conveyance of the document sheet from the document sheet feeding section to a predetermined document reading position. The movable guide is projectable into the sheet conveyance passage.

The outer guide includes an outer curved guide surface defining an outer surface of the curved sheet conveyance passage, and an opening formed in the outer curved guide surface. The inner guide includes an inner curved guide surface defining an inner surface of the curved sheet conveyance passage, and a first flat part being a flat surface having a predetermined distance, the first flat part constituting a part of the inner curved guide surface. The movable guide includes a projecting portion projectable into the sheet conveyance passage through the opening of the outer guide, and a second flat part provided in the projecting portion. The movable guide is attached to the outer guide in such a way as to allow the first flat part and the second flat part to face each other with the projecting portion projecting in the sheet conveyance passage.

An image forming apparatus according to another aspect of the present disclosure includes the above-described document sheet conveyance device, a document reading section for optically acquiring an image on a document surface of the document sheet passing over the document reading position, and an image forming section for forming an image on a sheet in accordance with image data outputted from the document reading section.

These and other objects, features and advantages of the present disclosure will become more apparent upon reading the following detailed description along with the accompanying drawings.

DETAILED DESCRIPTION

Figure 1:
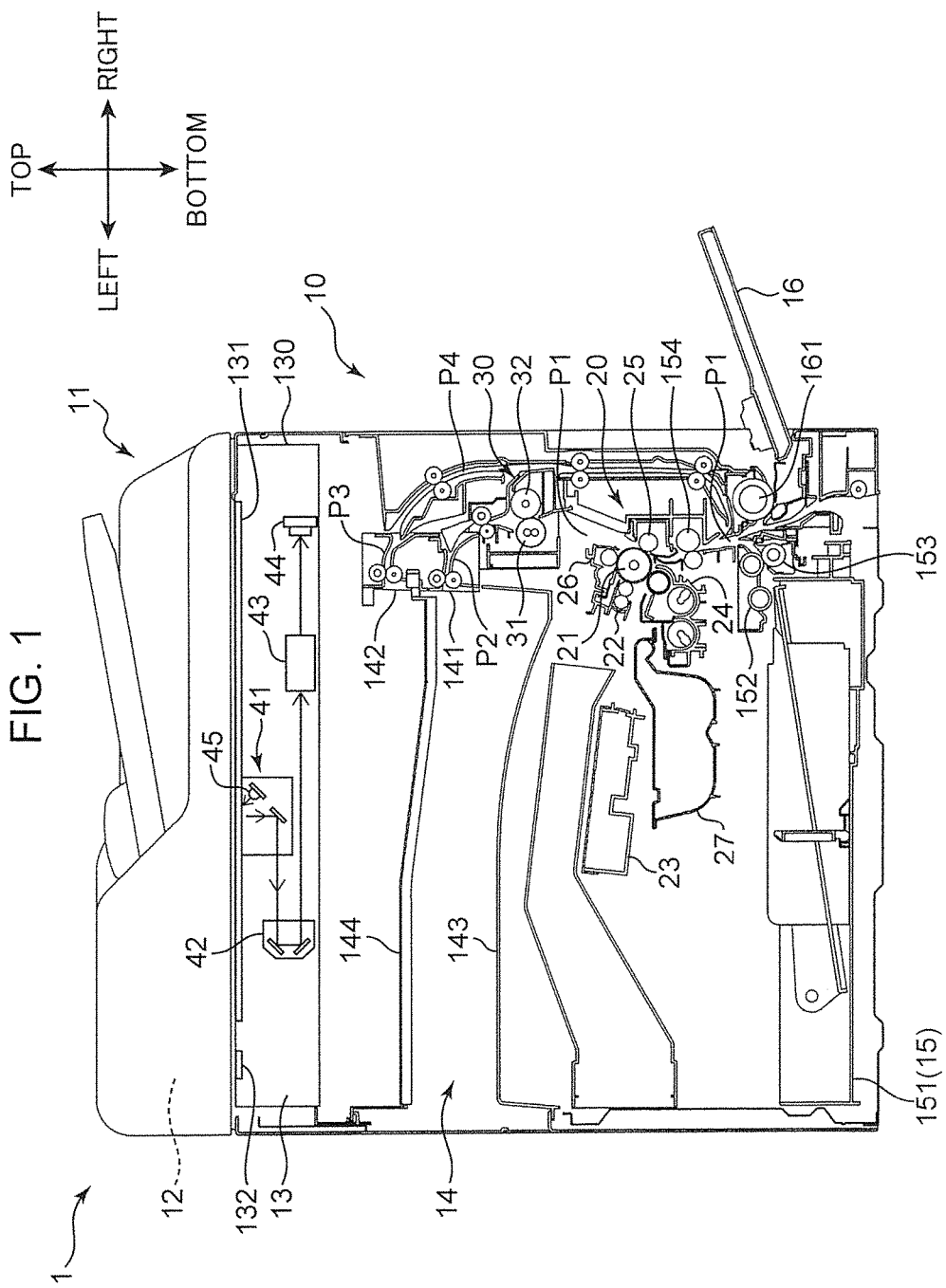
FIG. 1 is a sectional view showing a schematic configuration of an image forming apparatus including a document sheet conveyance device according to the present disclosure.

Hereinafter, an embodiment of the present disclosure will be described in detail with reference to the accompanying drawings. FIG. 1 is a sectional view showing a schematic configuration of an image forming apparatus 1 including a document sheet conveyance device according to an embodiment of the present disclosure. In the present embodiment, the image forming apparatus 1 is illustrated as a monochrome copier of an internal discharge type that includes an automatic document feeding device (ADF) 11 serving as an example of the document sheet conveyance device. However, the apparatus including the document sheet conveyance device of the present disclosure is not limited to the one described in the present embodiment, and may alternatively be provided as a color printer, a scanner, a facsimile machine or multifunction machine.

The image forming apparatus 1 includes a main housing 10 having a substantially rectangular parallelepiped shape, and the ADF 11 disposed on an upper surface of the main housing 10. The main housing 10 houses various components for performing image formation on a sheet. The ADF 11 automatically conveys a document sheet to be copied over an image reading position (upper surface of a second contact glass 132) that is set on the upper surface of the main housing 10. A conveyance mechanism 12 for conveying the document sheet is incorporated in a left inner portion of the ADF 11. The ADF 11 will be described in detail later.

In an upper portion of the main housing 10, there is disposed a scanner 13 (document reading section) for optically reading (acquiring) an image on a document surface of a document sheet passing over the image reading position. The scanner 13 includes a scanner casing 130, a first contact glass 131 for reading a manually placed sheet, and the second contact glass 132 for reading an automatically fed sheet. An upper surface of the first contact glass 131 serves as a document reading surface for a document sheet placed by a user, and the upper surface of the second contact glass 132 serves as a document reading surface over which a document sheet automatically fed from the ADF 11 passes.

Figure 7:
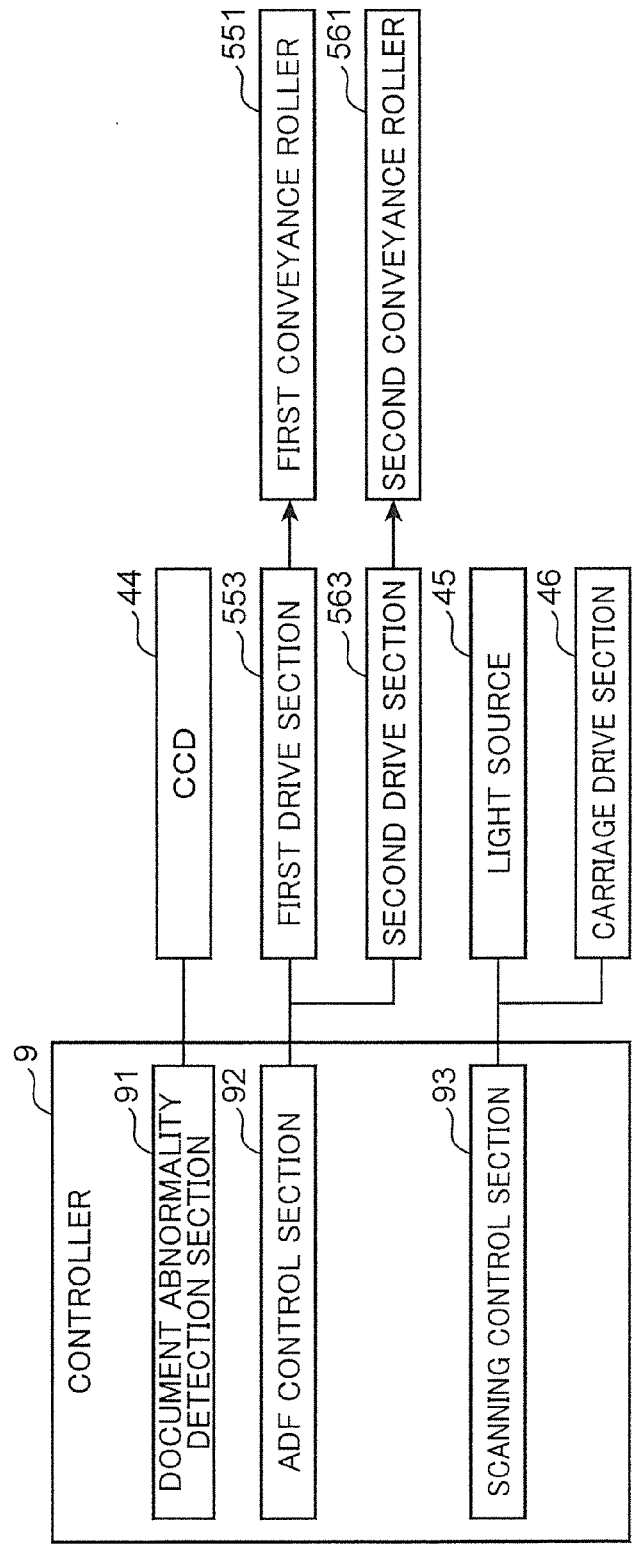
FIG. 7 is a block diagram showing a control configuration of the document sheet conveyance device.

The scanner 13 includes a first carriage 41, a second carriage 42, a condensing lens unit 43, and a charge coupled device (CCD) 44 that are housed in the scanner casing 130. The first carriage 41 is mounted with a light source 45 for emitting illumination light to a document sheet on the document reading surface and a reflection mirror, and reciprocates in a left/right direction (sub-scanning direction). The second carriage 42 is mounted with a plurality of reflection mirrors, and reciprocates half the distance of the first carriage 41 in the left/right direction. The condensing lens unit 43 receives reflected light of the illumination light emitted to the document sheet via the reflection mirrors of the first and second carriages 41, 42 and forms an optical image of the reflected light on an imaging surface of the CCD 44. The CCD 44 receives the reflected light and performs photoelectric conversion of converting the received light into an analog electrical signal. The analog electrical signal is converted into a digital electrical signal by an A/D conversion circuit (not shown) and inputted to a controller 9 (FIG. 7).

Below the scanner 13, an in-body sheet receiving section 14 is disposed which is capable of storing sheets having been subjected to the image formation. In a lower portion of the main housing 10, a sheet feeding cassette 15 is detachably mounted which is capable of storing sheets to be subjected to the image formation. A manual feed tray 16 is attached to a right wall of the main housing 10. The main housing 10 includes a first discharge port 141 and a second discharge port 142 open to the space defining the in-body sheet receiving section 14. A sheet discharged through the first discharge port 141 is received by an in-body sheet receiving tray 143. A sub-sheet receiving tray 144 is mounted above the in-body sheet receiving tray 143. A sheet discharged through the second discharge port 142 is received by the sub-sheet receiving tray 144 to be stacked thereon, or a sheet to be subjected to double-sided printing is temporarily discharged to the sub-sheet receiving tray 144 for switchback conveyance.

The main housing 10 houses, in addition to the above-mentioned scanner 13 and the sheet feeding cassette 15, an image forming section 20, a fixing section 30, and a sheet conveyance pathway. The image forming section 20 forms an image on a sheet in accordance with image data outputted from the scanner 13. The image forming section 20 includes a photoconductive drum 21, and a charger 22, an exposure device 23, a developing device 24, a transfer roller 25, and a cleaning device 26 that are disposed around the photoconductive drum 21.

The photoconductive drum 21 rotates around its axis and has a circumferential surface for allowing an electrostatic latent image and a toner image to be formed thereon. The charger 22 uniformly charges the circumferential surface of the photoconductive drum 21. The exposure device 23 irradiates the circumferential surface of the photoconductive drum 21 with beams of laser light in order to form an electrostatic latent image. The developing device 24 supplies toner to the circumferential surface of the photoconductive drum 21 in order to develop an electrostatic latent image formed on the photoconductive drum 21. The transfer roller 25 defines a transfer nip in cooperation with the photoconductive drum 21 and transfers a toner image on the photoconductive drum 21 onto a sheet. The cleaning device 26 cleans the circumferential surface of the photoconductive drum 21 after a toner image is transferred from the circumferential surface. A toner container 27 for supplying toner to the developing device 24 is disposed adjacent to the developing device 24.

The fixing section 30 includes a fixing roller 31 having a built-in heating source, and a pressing roller 32 forming a fixing nip in cooperation with the fixing roller 31. The fixing section 30 heats and presses at the fixing nip a sheet having a toner image transferred thereon at the transfer nip, thereby performing a fixing process. The sheet having been subjected to the fixing process is discharged to the in-body sheet receiving section 14 through the first discharge port 141 or the second discharge port 142.

The sheet conveyance pathway includes a main conveyance passage P1 extending vertically from the lower portion to the upper portion of the main housing 10 through the image forming section 20 and the fixing section 30. A first discharge conveyance passage P2 for guiding a sheet to the first discharge port 141 branches off from the vicinity of a downstream end of the main conveyance passage P1. Further, a second discharge conveyance passage P3 for guiding a sheet to the second discharge port 142 is connected to the most downstream end of the main conveyance passage P1. Further, a reverse conveyance passage P4 for allowing reverse conveyance of a sheet in double-sided printing extends from the most downstream end to the vicinity of an upstream end of the main conveyance passage P1.

The sheet feed cassette 15 includes a sheet storage portion 151 for storing a stack of sheets. Near an upper right corner of the sheet storage portion 151, there are disposed a pickup roller 152 for picking up the sheets one by one from the top sheet of the stack, and a pair of sheet feeding rollers 153 for advancing the picked-up sheet to the upstream end of the main conveyance passage P1. A sheet placed on the manual feed tray 16 is advanced to the upstream end of the main conveyance passage P1 by a manual feed sheet feeding roller 161. At the upstream side of the image forming section 20 in the main conveyance passage P1, there is disposed a pair of registration rollers 154 for advancing a sheet to the transfer nip at a predetermined timing.

When a sheet is subjected to single-sided printing, the sheet is fed from the sheet storing portion 151 or the manual feed tray 16 into the main conveyance passage P1 and subsequently subjected to the toner image transfer process at the image forming section 20 and then to the fixing process of fixing the transferred toner on the sheet at the fixing section 30. Thereafter, the sheet is discharged onto the in-body sheet receiving tray 143 through the first sheet discharge port 141 by way of the first discharge conveyance passage P2. On the other hand, when a sheet is subjected to double-sided printing, after one side of the sheet is subjected to the transfer process and the fixing process, a part of the sheet is discharged onto the sub-sheet receiving tray 144 through the second sheet discharge port 142 by way of the second discharge conveyance passage P3. Thereafter, the sheet is returned to the vicinity of the upstream end of the main conveyance passage P1 by the way of the reverse conveyance passage P4 in the manner of switchback. Thereafter, the other side of the sheet is subjected to the transfer process and the fixing process, and the sheet is then discharged onto the in-body sheet receiving tray 143 through the first sheet discharge port 141 by way of the first discharge conveyance passage P2.

Figure 2:
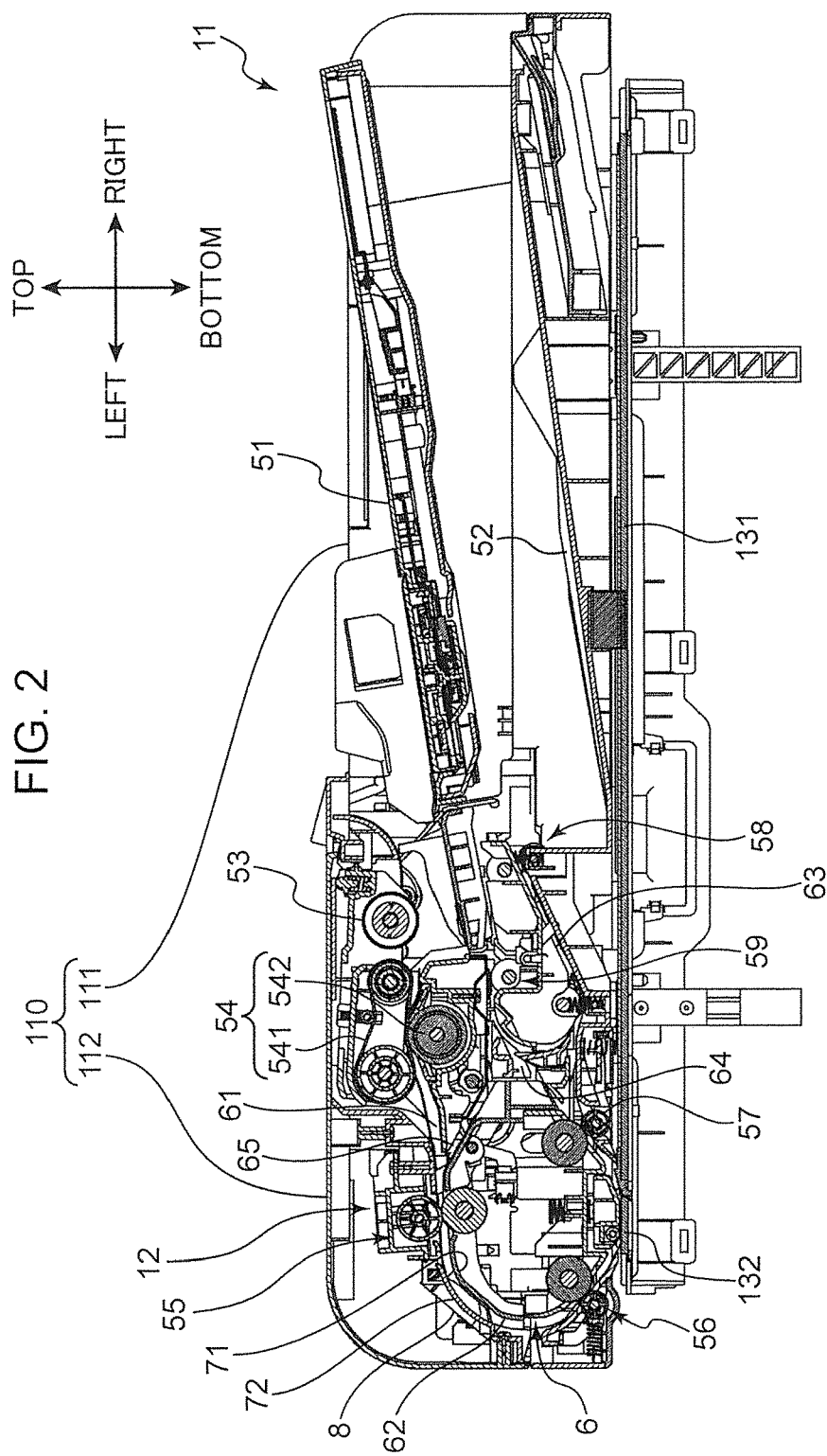
FIG. 2 is a sectional view of the document sheet conveyance device.
Figure 3:
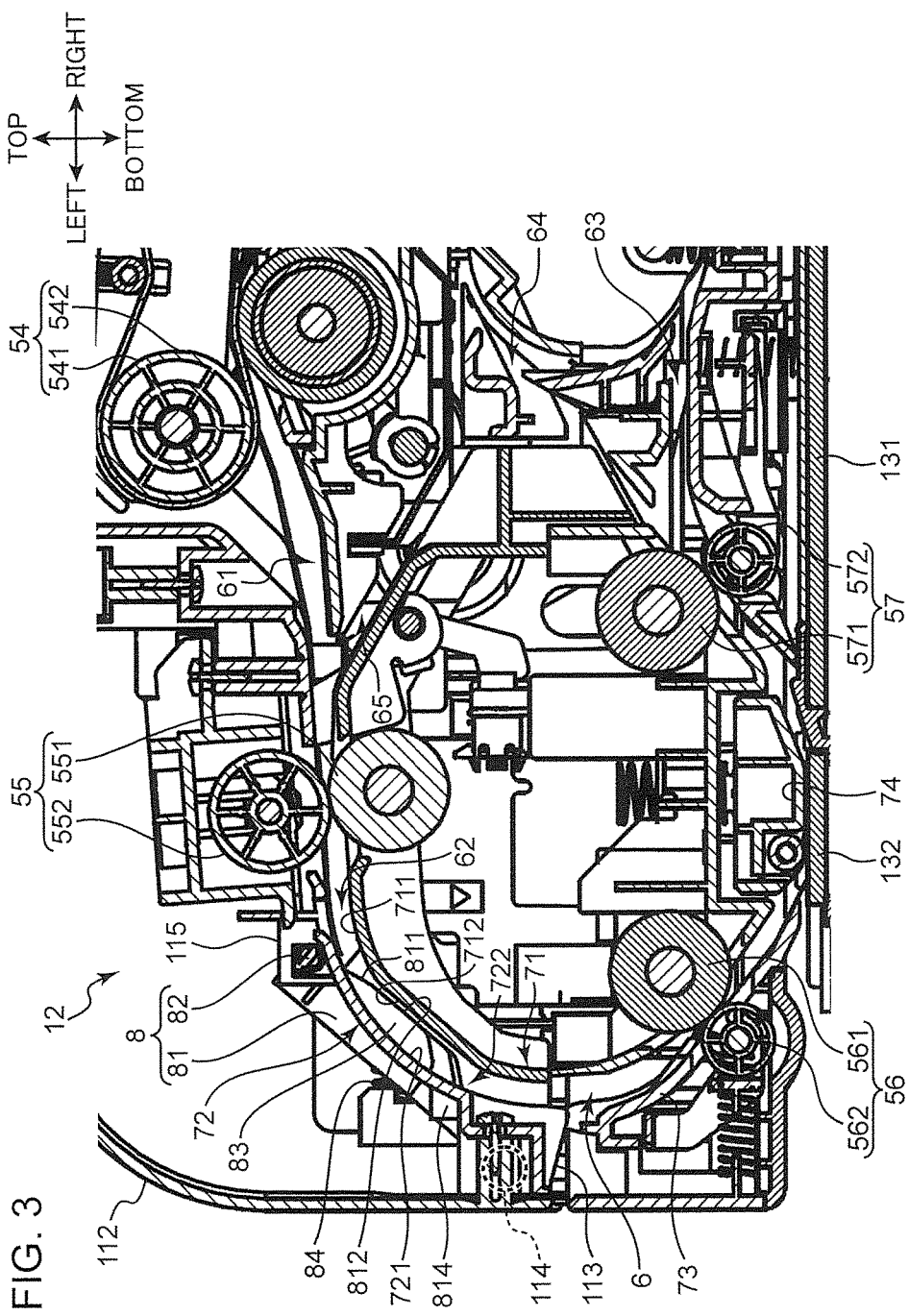
FIG. 3 is an enlarged sectional view of an essential part of FIG. 2.

Now, the ADF 11 will be described in detail. FIG. 2 is a sectional view of the ADF 11, and FIG. 3 is an enlarged sectional view of an essential part of FIG. 2. The ADF 11 includes a housing 110, a document tray 51 and a discharge tray 52 disposed vertically adjacent to each other in the right side of the housing 110, and the conveyance mechanism 12 disposed in the left side of the housing 110.

The document tray 51 allows a document sheet to be placed thereon, an image of the document sheet being to be read by the scanner 13. The discharge tray 52 receives a document sheet discharged after being subjected to the image reading. Above a left end of the document tray 51, there is disposed a pick-up roller 53 for picking up and advancing a document sheet to be read. The conveyance mechanism 12 includes various conveyance rollers for conveying a document sheet, a sheet conveyance pathway 6 for allowing passage of the document sheet, and guide members defining the sheet conveyance pathway 6, the conveyance mechanism 12 being configured to convey a document sheet from the document tray 51 to the discharge tray 52 through the sheet conveyance pathway 6.

The sheet conveyance pathway 6 includes, from the upstream region in a sheet conveyance direction going from the document tray 51 to the discharge tray 52, a first conveyance passage 61 extending in a substantially horizontal direction from the right to the left, a second conveyance passage 62 having the shape of C (curved sheet conveyance passage), and a third conveyance passage 63 extending in a substantially horizontal direction from the left to the right in this order. The second conveyance passage 62 has a curved shape, including an upstream conveyance passage portion joining the first conveyance passage 61 and curving downward from a lateral (leftward) extension and a downstream conveyance passage portion curving in a lateral direction (rightward) from a downward extension. In other words, the second conveyance passage 62 is curved in such a way as to change the document sheet conveyance direction by substantially 180 degrees from the left direction to the right direction. A downstream end of the second conveyance passage 62 reaches an upstream end of the second contact glass 132 serving as the document reading position. The third conveyance passage 63 extends from a downstream end of the second contact glass 132 to the discharge tray 52.

In addition, the sheet conveyance pathway 6 includes a fourth conveyance passage 64 and a fifth conveyance passage 65 to be used for switchback when both sides of a document sheet are read. The fourth conveyance passage 64 branches off from an intermediate portion of the third conveyance passage 63 and extends obliquely right upward. The fifth conveyance passage 65 connects the fourth conveyance passage 64 and the first conveyance passage 61 for returning a switch-backed document sheet to the upstream region of the sheet conveyance pathway 6.

In the present embodiment, the conveyance mechanism 12 includes, as the conveyance rollers, a sheet feeding roller unit 54, a first pair of conveyance rollers 55, a second pair of conveyance rollers 56, a third pair of conveyance rollers 57, a pair of sheet discharge rollers 58, and a pair of reversing rollers 59. These pairs of rollers are disposed from the upstream region to the downstream region of the sheet conveyance pathway 6 in this order.

The sheet feeding roller unit 54 is disposed at the most upstream position of the sheet conveyance pathway 6 (first conveyance passage 61), and advances a document sheet picked up by the pick-up roller 53 from the document tray 51 to the downstream region of the sheet conveyance pathway 6. The sheet feeding roller unit 54 includes a sheet feeding belt 541 and a separation roller 542 facing each other. The sheet feeding belt 541 is wound around a driving roller and a driven roller. The separation roller 542 is disposed between the above-mentioned rollers and comes into contact with the sheet feeding belt 541 from below to thereby form a sheet feeding nip.

A document sheet picked up by the pick-up roller 53 is advanced to the sheet feeding nip. Rotation of the driving roller causes the sheet feeding belt 541 to circulate so that the document sheet having reached the sheet feeding nip is advanced leftward. The separation roller 542 serves to supply only one document sheet into the sheet conveyance pathway 6 when a plurality of document sheets have reached the sheet feeding nip in a stacked state. The described document tray 51, the pick-up roller 53, and the sheet feeding roller unit 54 constitute a document sheet feeding section for feeding a document sheet to be read.

The first pair of conveyance rollers 55 is disposed between the first conveyance passage 61 and the second conveyance passage 62, i.e. on an upstream end of the curved second conveyance passage 62. The first pair of conveyance rollers 55 serves as a pair of registration rollers for correcting skew of a document sheet, and includes a first conveyance roller 551 serving as a driving roller, and a first facing roller 552 serving as a driven roller. A document sheet advanced from the sheet feeding roller unit 54 is temporarily stopped at a nip of the first pair of conveyance rollers 55, and is advanced to the second conveyance passage 62 when a torque is applied to the first conveyance roller 551 at a predetermined timing.

The second pair of conveyance rollers 56 is disposed at a downstream end of the second conveyance passage 62, and advances a document sheet to the document reading position (second contact glass 132). The second pair of conveyance rollers 56 includes a second conveyance roller 561 serving as a driving roller, and a second facing roller 562 serving as a driven roller. The document sheet advanced by the second pair of conveyance rollers 56 passes through a gap between a facing member 74 and the second contact glass 132.

The third pair of conveyance rollers 57 is disposed in the third conveyance passage 63 and between the fourth conveyance passage 64 and the second contact glass 132, and advances a document sheet to the discharge tray 52 or to the fourth conveyance passage 64 for switch back. The third pair of conveyance rollers 57 includes a third conveyance roller 571 serving as a driving roller, and a third facing roller 572 serving as a driven roller.

The pair of sheet discharge rollers 58 is disposed at a downstream end of the third conveyance passage 63, and advances a document sheet advanced by the third pair of conveyance rollers 57 to the discharge tray 52. The pair of reversing rollers 59 is disposed in the fourth conveyance passage 64, and conveys a document sheet in the manner of switch-back. The pair of reversing rollers 59 rotates in a forward direction to receive a document sheet advanced from the third pair of conveyance rollers 57 into the downstream region of the fourth conveyance passage 64. Thereafter, the pair of reversing rollers 59 rotates in a reverse direction to advance the received document sheet to the upstream side of the first pair of conveyance rollers 55 by way of the fifth conveyance passage 65.

The conveyance mechanism 12 includes a plurality of guide members defining the sheet conveyance pathway 6 (the first to fifth conveyance passages 61 to 65). Each guide member consists of a pair of guide portions defining opposite guide surfaces of the sheet conveyance pathway 6. Here, a guide member of the second conveyance passage 62 will be described in detail, the second conveyance passage 62 being provided as the curved sheet conveyance passage for conveying a document sheet conveyed therein from the document sheet feeding section through the first conveyance passage 61 to the document reading position.

The second conveyance passage 62 is defined by an inner guide 71 constituting the inner side of the C-shaped passage, and an outer guide 72 and a lower outer guide 73 constituting the outer side of the C-shaped passage. The upstream conveyance passage portion of the second conveyance passage 62 is defined by an upper half of the inner guide 71 and the outer guide 72 oppositely spaced from each other. The downstream conveyance passage portion of the second conveyance passage 62 is defined by a lower half of the inner guide 71 and the lower outer guide 73 oppositely spaced from each other. Further, in the present embodiment, a movable guide 8 projectable into the second conveyance passage 62 is attached to the outer guide 72. The first pair of conveyance rollers 55 is disposed upstream of the movable guide 8, and the second pair of conveyance rollers 56 is disposed downstream of the movable guide 8.

The housing 110 houses the sheet feeding roller unit 54 and the pairs of rollers 55 to 59, and the guide members including the inner guide 71, the outer guide 72, the lower outer guide 73, and the movable guide 8. The housing 110 includes a housing body 111, and a cover member 112 openable with respect to the housing body 111. The outer guide 72 and the movable guide 8 are mounted on the cover member 112.

Figure 4:
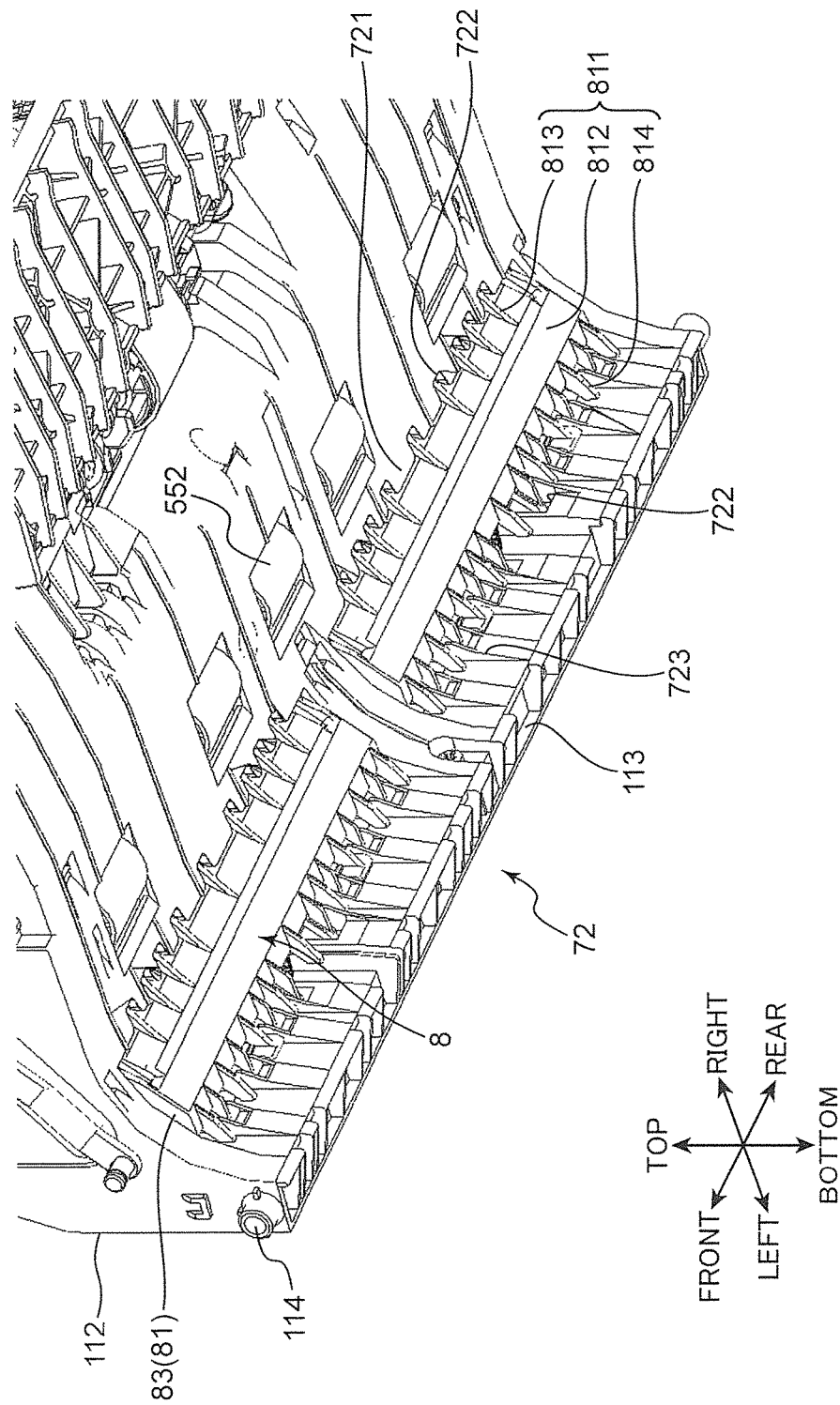
FIG. 4 is a perspective view of an outer guide.

FIG. 4 is a perspective view of the cover member 112 as seen from below. Rotary fulcrums 114 in the form of cylindrical projections are respectively formed on opposite surfaces of a lower end 113 of the cover member 112 in a front/rear direction. The housing body 111 includes shaft support portions (not shown) pivotally supporting the rotary fulcrums 114. The cover member 112 pivots on the rotary fulcrums 114 to open with respect to the housing body 111. As a result of the opening, the first conveyance passage 61 and the second conveyance passage 62 of the sheet conveyance pathway 6 are exposed to the outside.

The outer guide 72 is attached to a lower surface of a left end of the cover member 112. The outer guide 72 is in the form of a plate-like member and defines the upper half of the outer surface of the second conveyance passage 62 having the shape of C, the outer guide 72 having an outer curved guide surface 721 facing downward. The outer curved guide surface 721 curves in an arc of about 90 degrees. An opening 722 is formed in a middle portion of the outer curved guide surface 721 in the conveyance direction, the opening 722 extending in the front/rear direction. The opening 722 is provided for allowing a part (projecting portion 83) of the movable guide 8 to project into the second conveyance passage 62, and extends over the entirety of the outer guide 72 except for its opposite edges in the front/rear direction. A plurality of ribs 723 are formed at a downstream end of the outer curved guide surface 721, the ribs 723 extending in the conveyance direction. It should be noted that an outer portion of the outer curved guide surface 721 lying upstream (on the right side) of the first facing roller 552 has an outer guide surface of the first conveyance passage 61.

Figure 5:
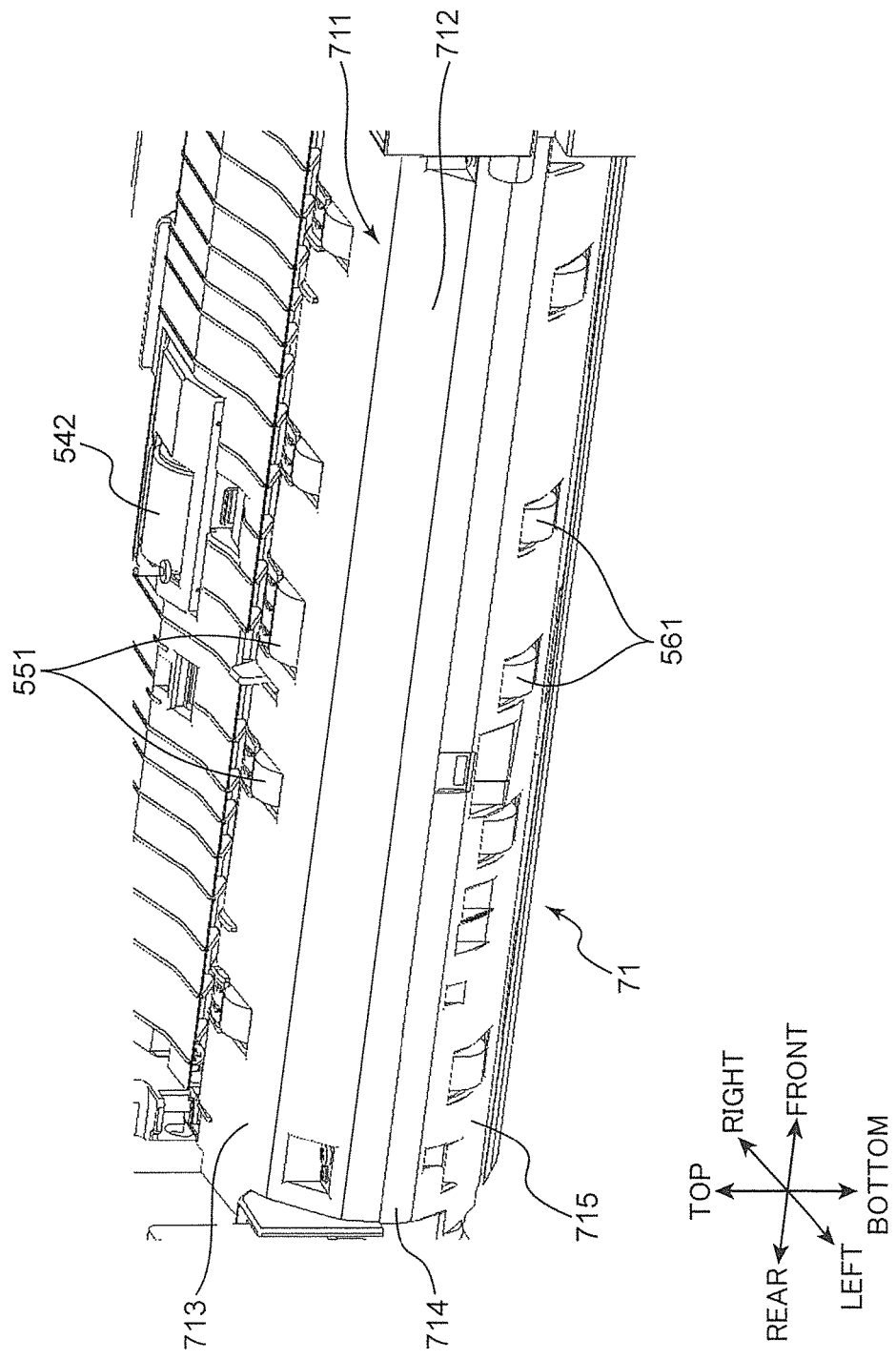
FIG. 5 is a perspective view of an inner guide.

FIG. 5 is a perspective view of the inner guide 71. The inner guide 71 is attached to a left end of the housing body 111. FIG. 5 is a perspective view illustrating a state in which the cover member 112 is detached and the lower outer guide 73 is removed from the housing body 111. The inner guide 71 is in the form of a plate-like member having the shape of C and defines the inner surface of the second conveyance passage 62, the inner guide 71 having an inner curved guide surface 711 on its outer side. An upper half of the inner guide 71, i.e. a portion curving about 90 degrees downward from a leftward extension, faces the outer guide 72. On the other hand, a lower half of the inner guide 71, i.e. a portion curving about 90 degrees rightward from a downward extension, faces the lower outer guide 73.

The inner guide 71 includes a first flat part 712 being a flat surface having a predetermined distance, the first flat part 712 constituting a part of the inner curved guide surface 711 and extending flat a predetermined distance. The first flat part 712 is disposed in a middle portion of the upper half of the inner guide 71 in the conveyance direction and faces the opening 722 of the outer guide 72. The first flat part 712 extends substantially over the entirety of the inner curved guide surface 711 in the front/rear direction linearly. The oblique angle of the first flat part 712 with respect to a horizontal plane can be set in the range from about 30 degrees to about 60 degrees.

The inner curved guide surface 711 includes an upstream area 713, the first flat part 712, an intermediate area 714, and a downstream area 715 in this order from the upstream region in the conveyance direction. The upstream area 713 is in the form of a curved guide surface extending from a position where the first conveyance roller 551 is disposed to an upstream edge of the first flat part 712. The intermediate area 714 is in the form of a curved guide surface extending from a downstream edge of the first flat part 712 to the vicinity of a position where the outer guide 72 faces the lower outer guide 73. The downstream area 715 is in the form of a curved guide surface on which the second conveyance roller 561 is disposed and which faces the lower outer guide 73. In other words, the inner curved guide surface 711 is curved except for the first flat part 712 extending flat. The dimension of the first flat part 712 in the conveyance direction can be appropriately set, but in the present embodiment, the first flat part 712 is illustrated as a flat surface occupying about half portion of the upper half of the inner guide 71 in the middle thereof in the conveyance direction.

With reference to FIGS. 3 and 4, the movable guide 8 has a greater dimension in the front/rear direction, and includes a main body 81 and fulcrums 82 in the form of projections, the fulcrums 82 being formed on side surfaces of an upstream end of the main body 81 and extending in the front-rear direction. The fulcrums 82 are fitted in support portions 115 disposed on a rear surface of the outer guide 72 in the vicinity of the upstream end of the C-shaped second conveyance passage 62. Consequently, the movable guide 8 is supported by the support portions 115 pivotally about an axis of the fulcrums 82.

The main body 81 has a slightly smaller dimension in the front/rear direction and a slightly greater dimension in the conveyance direction than the opening 722 of the outer guide 72. The main body 81 includes the projecting portion 83 projectable into the second conveyance passage 62 through the opening 722. The projecting portion 83 has a movable guide surface 811 that faces the inner guide 71. Because the movable guide 8 is disposed at the position corresponding to the opening 722 as described, the movable guide surface 811 faces the inner curved guide surface 711 of the inner guide 71.

The movable guide surface 811 includes a second flat part 812. The second flat part 812 has substantially the same dimensions in the front/rear direction and in the conveyance direction as the first flat part 712. The movable guide 8 is attached to the outer guide 72 in such a way as to allow the first flat part 712 and the second flat part 812 to face each other with the projecting portion 83 projecting in the second conveyance passage 62. The first flat part 712 and the second flat part 812 face each other at the upstream conveyance passage portion of the C-shaped second conveyance passage 62.

The movable guide surface 811 includes upstream ribs 813 disposed upstream of the second flat part 812 and downstream ribs 814 disposed downstream of the second flat part 812. The upstream ribs 813 gently slope to connect the outer curved guide surface 721 and an upstream edge of second flat part 812. The downstream ribs 814 gently slope to connect a downstream edge of the second flat part 812 and a downstream region of the outer curved guide surface 721. Respective lower ends of the downstream ribs 814 are in contact with the edge of the opening 722. Consequently, counterclockwise rotation of the fulcrums 82 of the movable guide 8 in FIG. 3 is restricted so that a predetermined gap is ensured between the first flat part 712 and the second flat part 812. The gap is narrower than the passage width of the second conveyance passage 62, i.e. the distance between the inner curved guide surface 711 and the outer curved guide surface 721, by the extent of projection of the projecting portion 83 in the second conveyance passage 62. A document sheet passes through such linear and narrow passage (hereinafter referred to as "narrow passage") defined between the first flat part 712 and the second flat part 812.

There is provided a biasing member 84 for applying a biasing force to drive the movable guide 8 to pivot about the axis of the fulcrums 82 (pivotal axis). In the present embodiment, the biasing member 84 is in the form of a compression coil spring. The biasing member 84 biases the movable guide 8 in such a way as to allow the movable guide 8 to pivot about the axis of the fulcrums 82 counterclockwise in FIG. 3, i.e. in a direction to bring the second flat part 812 closer to the first flat part 712. Owing to the biasing force of the biasing member 84, the lower ends of the downstream ribs 814 are pushed against the edge of the opening 722.

The biasing member 84 is designed such that the biasing force thereof is smaller than the stiffness of a thick document sheet (thick sheet). In other words, when a thick sheet is passed through the gap between the first flat part 712 and the second flat part 812, the biasing member 84 is pushed, owing to the stiffness of the thick sheet, to pivot clockwise about the axis of the fulcrums 82 in FIG. 3. Consequently, the projecting portion 83 recedes from the second conveyance passage 62 some distance. Therefore, even when a thick sheet is passed through the narrow passage defined between the flat parts 712, 812, there is no increase in the load of conveying the thick sheet nor generation of a loud friction noise.

On the other hand, the biasing member 84 is designed such that the biasing force thereof is greater than the stiffness of a document sheet (normal sheet) of a regular thickness and a regular paper quality and having a normal stiffness. In other words, when a normal sheet is passed through the narrow passage between the flat parts 712, 812, the movable guide 8 hardly pivots clockwise owing to the biasing force of the biasing member 84, so that the space of the narrow passage is maintained. Consequently, the document sheet comes into sliding contact with the first and second flat parts 712, 812 when passing through the narrow passage. A document sheet is placed on the document tray 51 with its document surface facing upward. Therefore, the document surface comes into sliding contact with the second flat part 812 when passing through the narrow passage. Accordingly, when a foreign matter or the like is adhered to the document surface, the foreign matter or the like is removed from the document surface during the sliding contact with the second flat part 812. In the case of a thick sheet, although the projecting portion 83 recedes from the second conveyance passage 62 some distance, a document surface of the thick sheet comes into sliding contact with the second flat part 812 in a similar manner, which therefore allows removal of a foreign matter or the like from the document surface in a similar manner.

Figure 6:
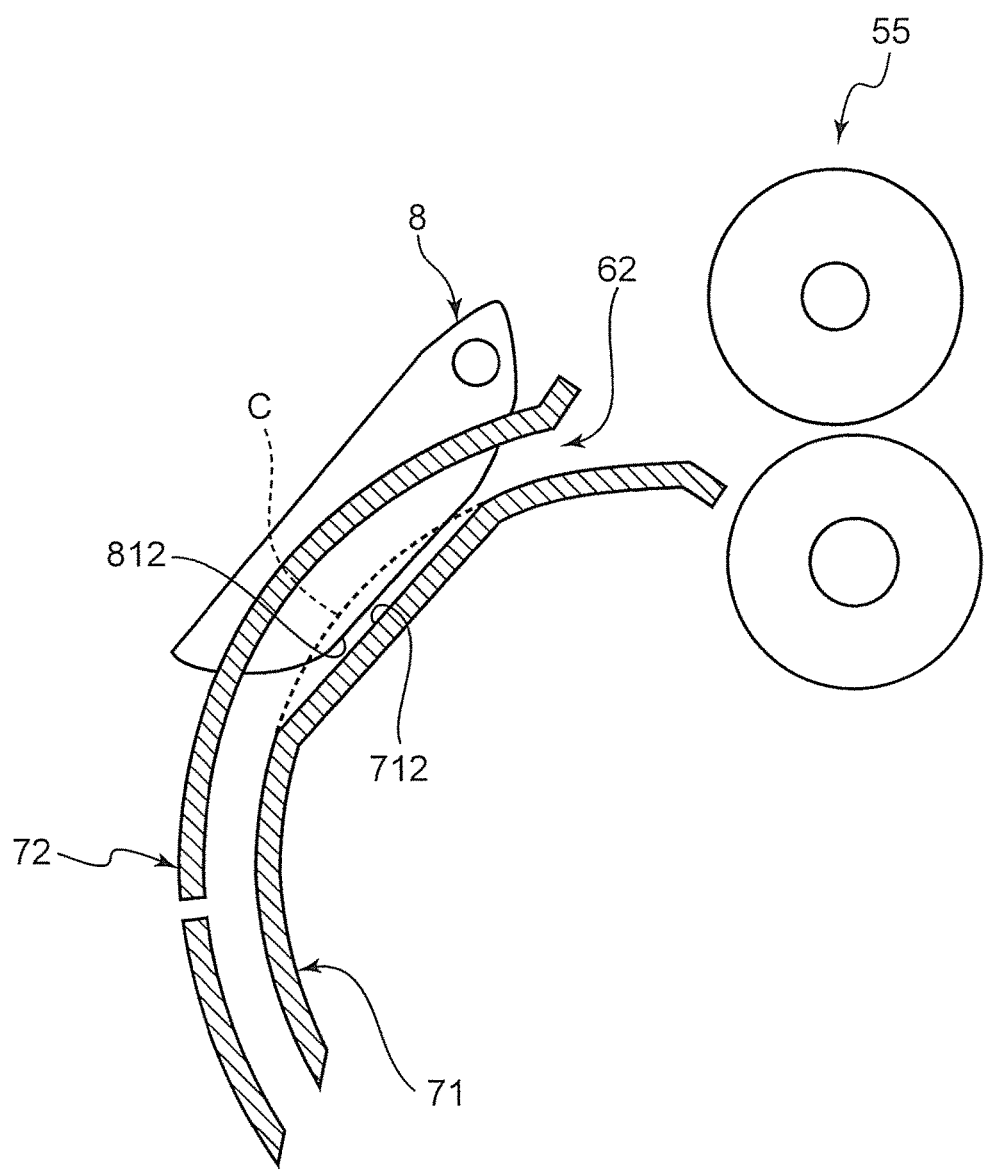
FIG. 6 is an enlarged sectional view showing respective flat parts of the inner guide and a movable guide.

The first and second flat parts 712, 812 will be additionally described with reference to FIG. 6 showing an enlarged sectional view of these parts. The first flat part 712 constitutes a part of the inner curved guide surface 711 and extends flat. In FIG. 6, a circle of curvature C of the inner curved guide surface 711 is shown by a dotted line. The first flat part 712 lies inside the circle of curvature C. The second flat part 812 of the movable guide 8 faces the first flat part 712 at a position inside the circle of curvature C.

Consequently, the linear narrow passage defined by the first and second flat parts 712, 812 lies inside the circle of curvature C of the inner curved guide surface 711. This allows a document sheet, when being conveyed through the curved second conveyance passage 62, to pass through the narrow passage not in the state along the circle of curvature C but in the state slightly bent to the inside of the circle of curvature C. Consequently, document surfaces of the document sheet are more likely to come into sliding contact with the first and second flat parts 712, 812 over the entirety thereof in the sheet conveyance direction relatively strongly. As a result, the effect of the foreign matter removal by the first and second flat parts 712, 812 can be enhanced.

Now, a control configuration of the ADF 11 will be described with reference to the block diagram of FIG. 7. The image forming apparatus 1 includes the controller 9 for controlling the operations of the image forming apparatus 1 including the ADF 11. Further, the image forming apparatus 1 includes, as hardware, a first drive section 553, a second drive section 563, and a carriage drive section 46, in addition to the above-mentioned components.

The first drive section 553 rotates the first conveyance roller 551. The second drive section 563 rotates the second conveyance roller 561. Various motors such as a DC motor or a stepping motor can be used as the first and second drive sections 553, 563. The carriage drive section 46 is a motor as a driving source for moving the first carriage 41 and the second carriage 42 of the scanner 13 in the sub-scanning direction.

The controller 9 includes a microcomputer, and controls the whole image formation operation performed by the image forming apparatus 1. In addition, in the present embodiment, the controller 9 is caused to function by reading a predetermined program as a document abnormality detection section 91, an ADF control section 92 (control section), and a scanning control section 93.

The document abnormality detection section 91 detects an image abnormality on the basis of an image acquired by the scanner 13 serving as the document reading section. A typical example of image abnormality is appearance of black stripes in a read image caused by adhesion of a foreign matter such as an ink to the second contact glass 132. Those black stripes are characterized by extending linearly in the sub-scanning direction. The document abnormality detection section 91 performs image processing such as edge detection processing on a read image to detect the presence/absence of black stripes.

Alternatively, the document abnormality detection section 91 detects an image abnormality on the basis of an image acquired when no document sheet is at the document reading position. For example, an image acquired by the CCD 44 during an interval between a plurality of successively read document sheets is normally in white color corresponding to the facing member 74 which is white. However, when a foreign matter is adhered to the second contact glass 132, black dots or black stripes appear in the white image. The document abnormality detection section 91 can detect an image abnormality also on the basis of such white image.

The ADF control section 92 controls the operations of the first drive section 553 and the second drive section 563 to thereby control the axial rotation speeds of the first conveyance roller 551 and the second conveyance roller 561. Specifically, when the document sheet conveyance is normally performed, the ADF control section 92 controls the first drive section 553 and the second drive section 563 in such a way to rotate the first conveyance roller 551 and the second conveyance roller 561 at the same speed. On the other hand, when an image abnormality is detected by the abnormality detection section 91, the ADF control section 92 controls the first drive section 553 and the second drive section 563 in such a way to rotate the first conveyance roller 551 and the second conveyance roller 561 at such different speeds that the first conveyance roller 551 rotates at a higher speed than the second conveyance roller 561.

Owing to such control by the ADF control section 92, a document sheet is conveyed along the sheet conveyance pathway 6 (second conveyance passage 62) by the first and second conveyance rollers 551, 561 rotating at the same speed when no image abnormality occurs. In this case, a document surface of the document sheet comes into sliding contact with the second flat part 812 of the movable guide 8 with the stiffness of the document sheet. In contrast, when an image abnormality occurs, the first conveyance roller 551 rotates at a higher speed than the second conveyance roller 561. The difference in speeds causes the document sheet being conveyed through the second conveyance passage 62 to be bent to bulge outward against the curve of the second conveyance passage 62, so that a document surface of the document sheet is pushed strongly against the second flat part 812 of the movable guide 8. Therefore, it is possible to bring the document surface into sliding contact with the second flat part 812 of the movable guide 8 more strongly, and in turn, to achieve an excellent foreign matter removal effect.

In a case where a stack of document sheets S is placed on the document tray 51, and the document abnormality detection section 91 detects an image abnormality of having black stripes when some document sheets of the stack have been read, the remainder sheets of the stack are highly likely to include document sheets that would cause adhesion of a foreign matter to the second contact glass 132. For example, there may be a case in which a stack of document sheets including some document sheets to which a user has made corrections with correction liquid is placed on the document tray 51 with the correction liquid being still wet. In such a case, upon detection of an image abnormality, the control to rotate the first and second conveyance rollers 551, 561 at different speeds is performed to bring the document surface of the document sheet into active sliding contact with the second flat part 812 strongly. Consequently, it is possible to prevent an additional adhesion of a foreign matter to the second contact glass 132 in the subsequent document sheet reading operations.

In the above case, even when the speed difference control is performed, the foreign matter has been adhered to the second contact glass 132 and the black stripes have appeared already. Accordingly, it is desirable to take some measures. The scanning control section 93 performs, in addition to the normal control of controlling the image acquisition operation of the scanner 13, a control to shift the document reading position in the sub-scanning direction to remove the foreign matter from the optical path of the document reading in cases such as the above-described one.

The scanning control section 93 controls the lighting of the light source 45, and the movements of the first and second carriages 41, 42 driven by the carriage drive section 46. In addition, when the automatic reading of document sheets fed by the ADF 11 is performed and an image abnormality is detected by the document abnormality detection section 91, the scanning control section 93 shifts the first and second carriages 41, 42 slightly in the sub-scanning direction with the light source 45 turned on. At this time, the document abnormality detection section 91 monitors the presence/absence of an image abnormality. Thereafter, the scanning control section 93 sets a new image reading position at a position where no image abnormality appears, and causes the first and second carriages 41, 42 to stop at the new image reading position. Consequently, the subsequent document sheet reading operations can be performed without occurrence of image abnormality such as black stripes.

Figure 8:
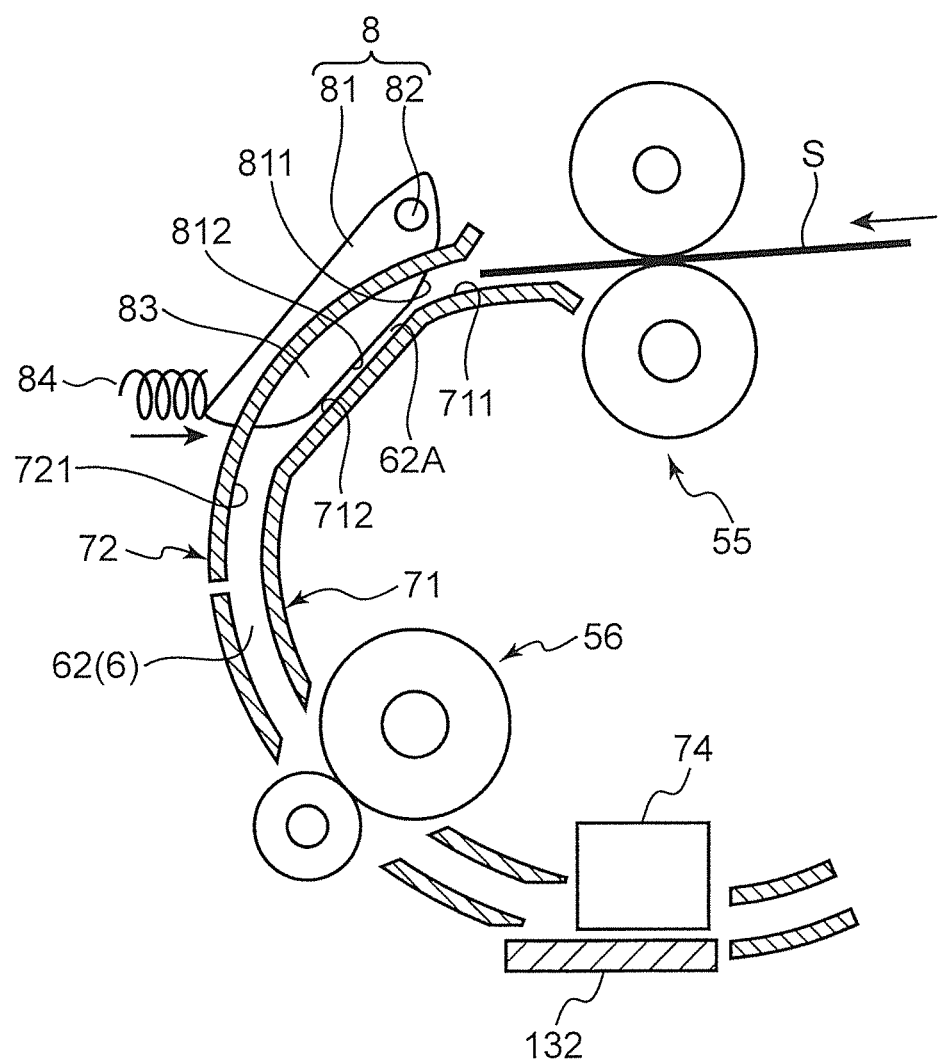
FIG. 8 is a schematic sectional view illustrating a feeding state of a document sheet into a sheet conveyance passage.

FIGS. 8 to 11 are schematic views each illustrating a feeding state of a document sheet S into the second sheet conveyance passage 62 (sheet conveyance pathway 6). FIG. 8 illustrates a state in which a document sheet S reaches the upstream end of the second conveyance passage 62 immediately before entering the narrow passage 62A defined between the first flat part 712 of the inner curved guide surface 711 and the second flat part 812 of the movable guide 8. After this state, a leading end of the document sheet S is guided by the upstream ribs 813 (FIG. 4) of the movable guide surface 811 to enter the narrow passage 62A.

Figure 9:
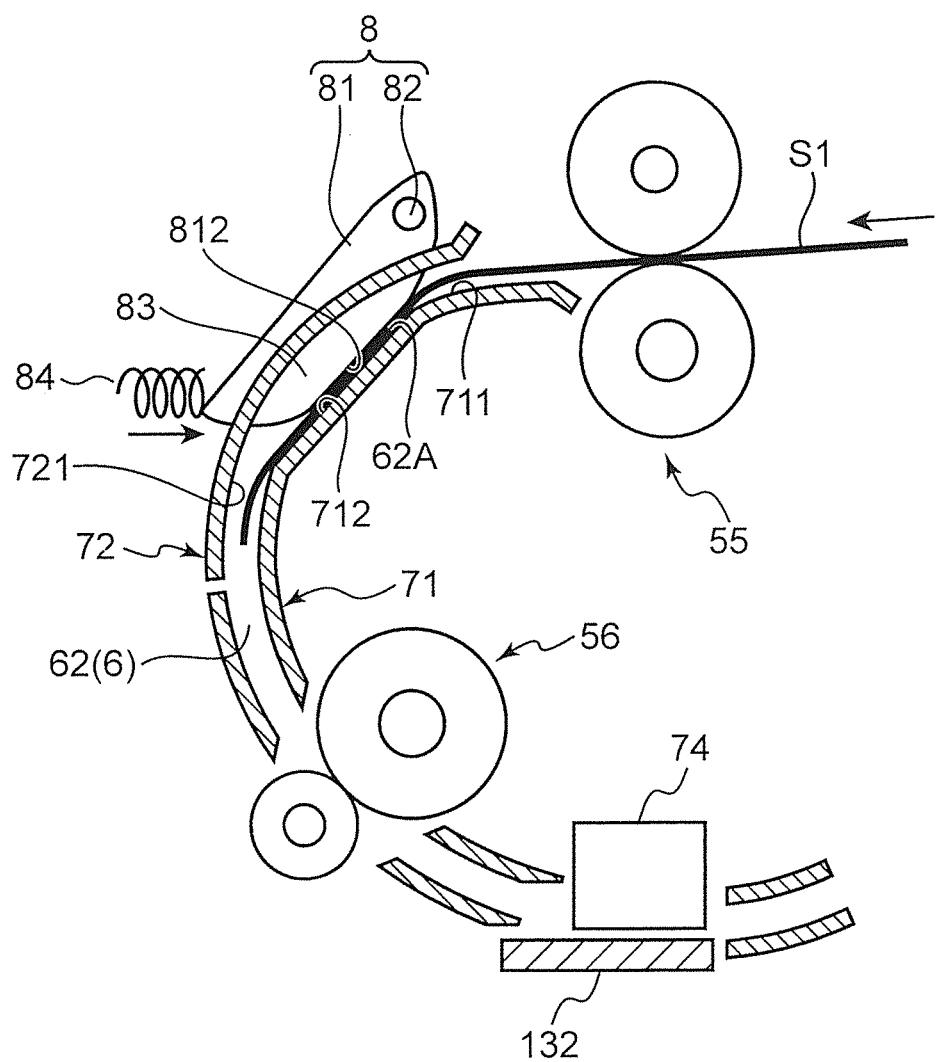
FIG. 9 is a schematic sectional view illustrating a feeding state of a document sheet into the sheet conveyance passage.

FIG. 9 illustrates a state in which a normal sheet S1 passes through the narrow passage 62A as a document sheet S, the normal sheet S1 being of a regular thickness and a regular paper quality and having a normal stiffness. The biasing force of the biasing member 84 is greater than the stiffness of the normal sheet S1. Therefore, even when the normal sheet S1 comes into contact with the movable guide 8, the projecting portion 83 hardly recedes from the second conveyance passage 62, i.e. the movable guide 8 hardly pivots clockwise on the fulcrums 82, so that the narrow passage 62A maintains the initial narrow clearance. This allows a document surface of the normal sheet S1 to come into sliding contact with the second flat part 812 to remove a foreign matter on the document surface by the sliding contact.

Figure 10:
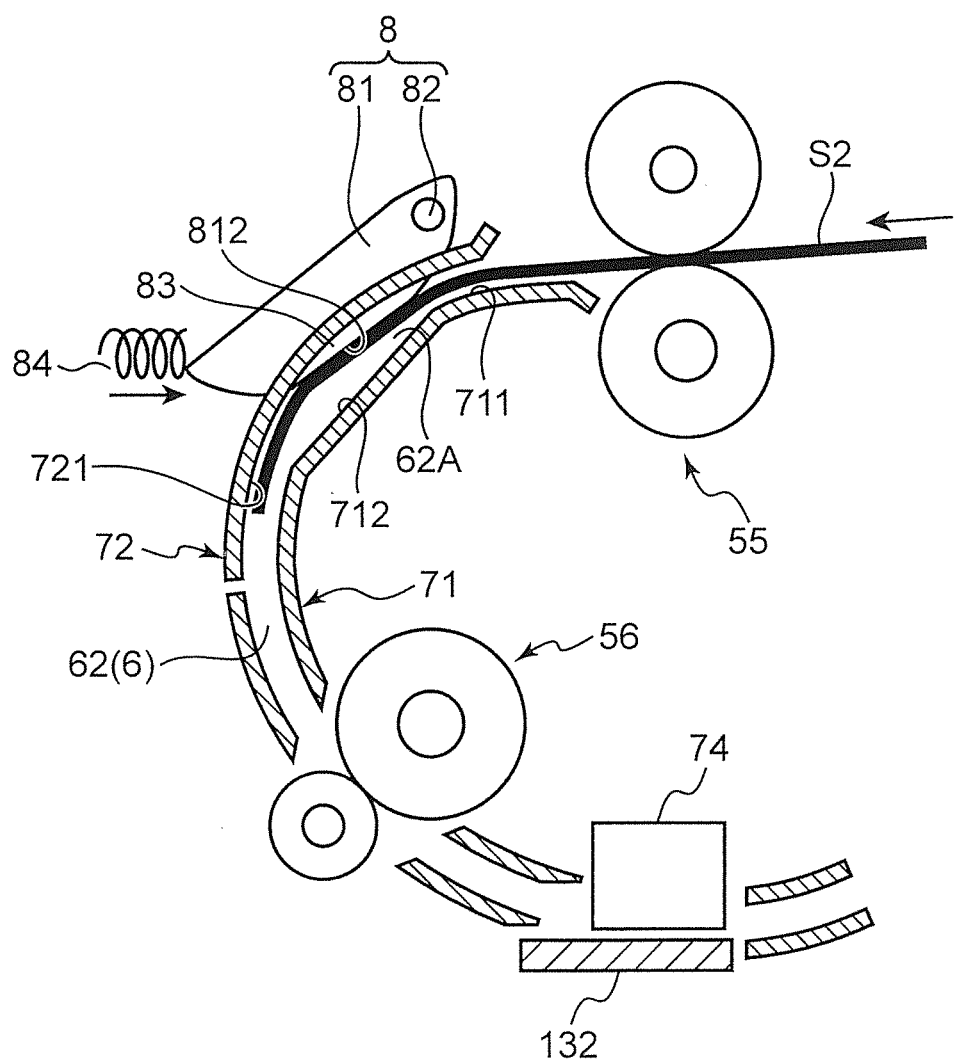
FIG. 10 is a schematic sectional view illustrating a feeding state of a thick document sheet into the sheet conveyance passage.

FIG. 10 illustrates a state in which a thick sheet S2 passes through the narrow passage 62A as a document sheet S, the thick sheet S2 being thicker and having a greater stiffness than the normal sheet S1. The biasing force of the biasing member 84 is smaller than the stiffness of the thick sheet S2. Therefore, when the thick sheet S2 comes into contact with the movable guide 8, the projecting portion 83 recedes from the second conveyance passage 62 according to the stiffness of the thick sheet S2, i.e. the movable guide 8 pivots clockwise on the fulcrums 82 to a relatively large extent, so that the narrow passage 62A expands. Therefore, even when the thick sheet S2 is passed through the narrow passage 62A, there is no increase in the conveyance load nor generation of a loud friction noise. Further, because a document surface of the thick sheet S2 comes into contact with the second flat part 812 while pushing the movable guide 8, it is also possible to achieve the effect of removing a foreign matter from the document surface.

Figure 11:
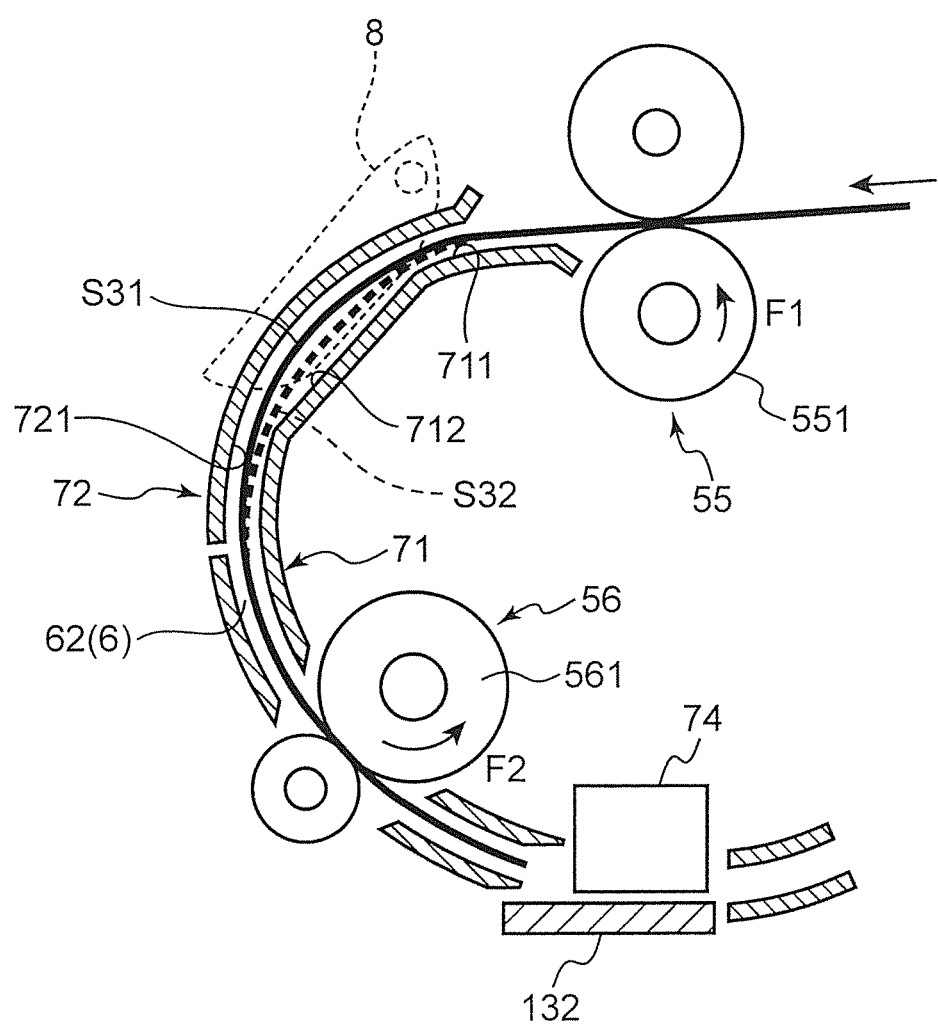
FIG. 11 is a schematic sectional view for explaining a state in which a document sheet is bent in the sheet conveyance passage.

FIG. 11 is a schematic sectional view for explaining a state in which a document sheet S31 being conveyed is bent in the second conveyance passage 62. As described, when an abnormality is detected in a read image, the ADF control section 92 rotates the first and second conveyance rollers 551, 561 such that a rotation speed F1 of the first conveyance roller 551 is greater than a rotation speed F2 of the second conveyance roller 561 (F1>F2). For example, when the conveyance speed of a document sheet S31 is 500 mm/sec, it is controlled such that F1 is about 2 percent greater than F2.

Such control causes the document sheet S31 being conveyed in the second conveyance passage 62 to be bent to bulge outward against the curve of the second conveyance passage 62. It should be noted that the dotted line in FIG. 11 shows a path of a document sheet S32 being conveyed without bending by the first and second conveyance rollers 551, 561 rotating at the same speed. The document sheet S31 caused to be bent comes into contact with the movable guide 8 more strongly than the document sheet S32. Therefore, a document surface of the document sheet S31 is brought into sliding contact with the second flat part 812 more strongly, which makes it possible to enhance the foreign matter removal effect.

Figure 12:
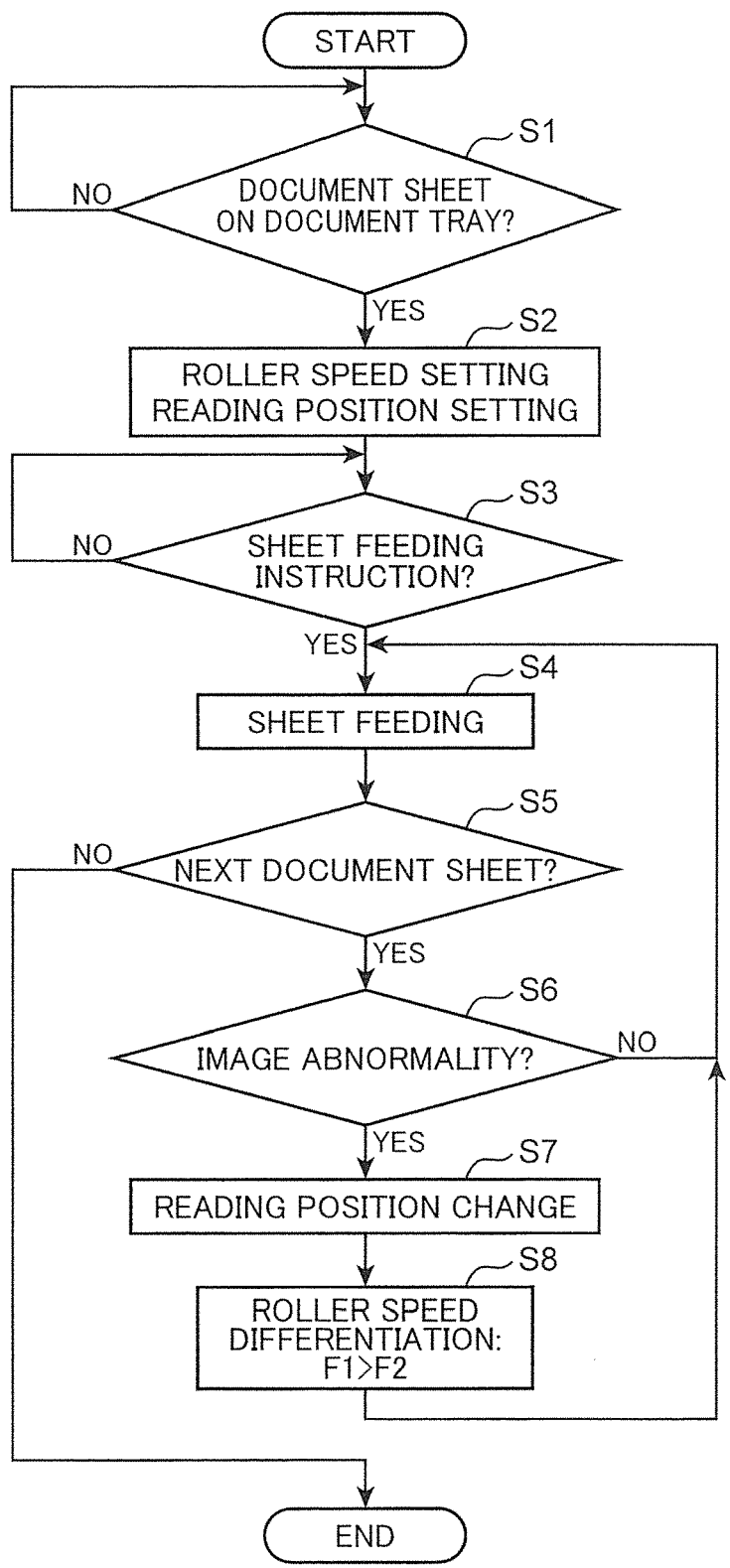
FIG. 12 is a flowchart showing an example of an operation of the document sheet conveyance device.

FIG. 12 is a flowchart showing a control operation of the ADF 11 performed by the controller 9, the operation including the speed difference control illustrated in FIG. 11. The controller 9 determines whether a document sheet is placed on the document tray 51 on the basis of an output signal from an unillustrated sheet sensor disposed on the document tray 51 (step S1). When it is detected that there is a document sheet on the document tray 51 (YES at step S1), the ADF control section 92 sets the rotation speeds of the first and second conveyance rollers 551, 561 to a default value (no difference in the speeds), and the scanning control section 93 sets the destination of the first carriage 41 to a default reading position (step S2).

Thereafter, the controller 9 waits for a sheet feeding instruction (step S3). Upon receipt of a sheet feeding instruction given by a user pushing a start button on an operation panel of the image forming apparatus 1 (YES at step S3), the scanning control section 93 moves the first carriage 41 to the reading position, and the ADF control section 92 drives the rollers including the pickup roller 53 and the other downstream rollers to thereby execute a feeding operation of the document sheet (step S4). As described, the rotation speeds F1, F2 of the first and second conveyance rollers 551, 561 driven by the first and second drive sections 553, 563, respectively, are set at the default rotation speed and are thus F1=F2.

Thereafter, the controller 9 determines whether there is a next document sheet on the document tray 51 (step S5). When there is no next document sheet (NO at step S5), the reading operation is terminated. On the other hand, when there is a next document sheet (YES at step S5), it is checked whether the document abnormality detection section 91 has detected an image abnormality (step S6). When no image abnormality has been detected (NO at step S6), the operation returns to step S4 to execute a feeding operation of the next document sheet.

In contrast, when an image abnormality has been detected (YES at step S6), the scanning control section 93 shifts the first carriage 41 from the reading position slightly in the sub-scanning direction, and performs the control to change the reading position (step S7). Further, the ADF control section 92 performs the control to set the rotation speeds F1, F2 of the first and second conveyance rollers 551, 561 such that F1 is greater than F2 to cause the document sheet passing through the second conveyance passage 62 to be bent (step S8). Thereafter, the operation returns to step S4 to execute a feeding operation of the next document sheet.

According to the above-described image forming apparatus 1 including the ADF 11 (document sheet conveyance device), the narrow passage 62A is defined in the curved second conveyance passage 62, the narrow passage 62A being defined by the first flat part 712 of the inner guide 71 and the second flat part 812 of the projecting portion 83 of the movable guide 8. The narrow passage 62A is a linear sheet passage having a predetermined length in the sheet conveyance direction and narrower than the clearance between the inner and outer curved guide surfaces 711, 721 by the extent of projection of the projecting portion 83 through the opening 722 of the outer guide 72. When a document sheet is conveyed, the document sheet comes into sliding contact with the first and second flat parts 712, 812 when passing through the narrow passage 62A, so that a foreign matter or the like on its document surface can be favorably removed. Further, the second flat part 812 is provided, not on a stationary guide, but on the movable guide 8 that pivots on the fulcrums 82. Therefore, when a thick document sheet having a strong stiffness is passed, it is possible to cause the second flat part 812 to recede from the second conveyance passage 62 according to the stiffness of the document sheet, so that an increase in the conveyance load of the document sheet can be prevented.

Further, the support portions 115 supporting the fulcrums 82 of the movable guide 8 are disposed in the vicinity of the upstream end of the C-shaped second conveyance passage 62, and the first and second flat parts 712, 812 are spaced oppositely at the upstream conveyance passage portion (upper portion) of the second conveyance passage 62. This allows the movable guide 8 to pivot on the fulcrums 82 in such a way to rise according to the stiffness of a document sheet passing through the upstream conveyance passage portion. Therefore, it is possible to satisfactorily bring a document surface of the document sheet into sliding contact with the second flat part 812.

Further, the outer guide 72 and the movable guide 8 are mounted on the cover member 112 openable with respect to the housing body 111. Opening of the cover member 112 exposes the first conveyance passage 61 and the second conveyance passage 62 of the sheet conveyance pathway 6 to the outside. Therefore, it is possible to expose not only the sheet conveyance pathway 6 but also the movable guide 8 by opening the cover member 112 with respect to the housing body 111. This allows a user to easily clean the second flat part 812, for example.

The embodiment of the present disclosure has been described. However, the present disclosure is not limited to the above-described configurations and can be modified in various ways. For example, in the above-described embodiment, the lower ends of the downstream ribs 814 of the movable guide 8 come into contact with the edge of the opening 722 of the outer guide 72 so that the narrow passage 62A is ensured between the first and second flat parts 712, 812. Alternatively, it may be configured such that the downstream ribs 814 do not come into contact with the opening edge and the biasing member 84 is omitted so that the movable guide 8 descends by its own weight. In this case, the first and second flat parts 712, 812 come into contact with each other. This makes it possible to bring a document surface into sliding contact with the second flat part 812 more reliably.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A document sheet conveyance device, comprising:
a document sheet feeding section for feeding a document sheet to be read;
an inner guide and an outer guide defining a curved sheet conveyance passage for allowing conveyance of the document sheet from the document sheet feeding section to a predetermined document reading position; and
a movable guide projectable into the sheet conveyance passage,
a first conveyance roller disposed upstream of the movable guide and a second conveyance roller disposed downstream of the movable guide in the curved sheet conveyance passage, the first and second conveyance rollers being operable to convey the document sheet;
a first drive section for rotating the first conveyance roller, and a second drive section for rotating the second conveyance roller;
a control section for controlling respective operations of the first drive section and the second drive section;
a document reading section for optically acquiring an image on a document surface of the document sheet passing over the document reading position; and
an abnormality detection section for detecting an image abnormality on the basis of the image acquired by the document reading section, wherein:
the outer guide includes an outer curved guide surface defining an outer surface of the curved sheet conveyance passage, and an opening formed in the outer curved guide surface;
the inner guide includes an inner curved guide surface defining an inner surface of the curved sheet conveyance passage, and a first flat part being a flat surface having a predetermined distance, the first flat part constituting a part of the inner curved guide surface;
the movable guide includes a projecting portion projectable into the sheet conveyance passage through the opening of the outer guide, and a second flat part provided in the projecting portion; and
the movable guide is attached to the outer guide in such a way as to allow the first flat part and the second flat part to face each other with the projecting portion projecting in the sheet conveyance passage, and wherein
the control section controls the first drive section and the second drive section in such a way to rotate the first conveyance roller and the second conveyance roller at the same speed when the document sheet conveyance is normally performed, and to rotate the first conveyance roller and the second conveyance roller at such different speeds that the first conveyance roller rotates at a higher speed than the second conveyance roller when an image abnormality is detected by the abnormality detection section.

2. The document sheet conveyance device according to claim 1, wherein:
the first flat part lies inside a circle of curvature of the inner curved guide surface; and
the second flat part faces the first flat part at a position inside the circle of curvature.

3. The document sheet conveyance device according to claim 1, further comprising:
a support section pivotally supporting the movable guide; and
a biasing member for applying a biasing force to drive the movable guide to pivot about a pivotal axis, wherein:
the movable guide includes a fulcrum on an upstream side thereof in a document sheet conveyance direction, the fulcrum being supported on the support section; and
the biasing member biases the movable guide in a direction to bring the second flat part closer to the first flat part.

4. The document sheet conveyance device according to claim 3, wherein
the curved sheet conveyance passage is in the shape of C, including an upstream conveyance passage portion curving downward from a lateral extension and a downstream conveyance passage portion curving in a lateral direction from a downward extension;
the support section is disposed in the vicinity of an upstream end of the C-shaped sheet conveyance passage; and
the first flat part and the second flat part are disposed in such a way as to face each other in the upstream conveyance passage portion.

5. The document sheet conveyance device according to claim 1, further comprising
a housing that houses the inner guide, the outer guide, and the movable guide, wherein:
the housing includes a housing body, and a cover member openable with respect to the housing, the cover member adapted to be opened to expose the sheet conveyance passage to an outside; and
the outer guide and the movable guide are mounted on the cover member.

6. An image forming apparatus, comprising:
a document sheet conveyance device according to claim 1;
a document reading section for optically acquiring an image on a document surface of the document sheet passing over the document reading position; and
an image forming section for forming an image on a sheet in accordance with image data outputted from the document reading section.

* * * * *